Aug. 16, 1966 C. B. ROGERS 3,266,062
RETRACTABLE BED
Filed Feb. 26, 1962 7 Sheets-Sheet 7
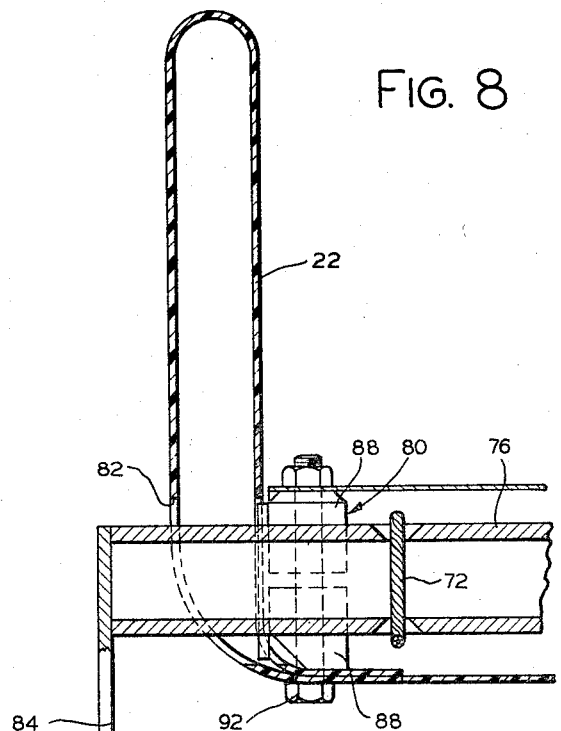
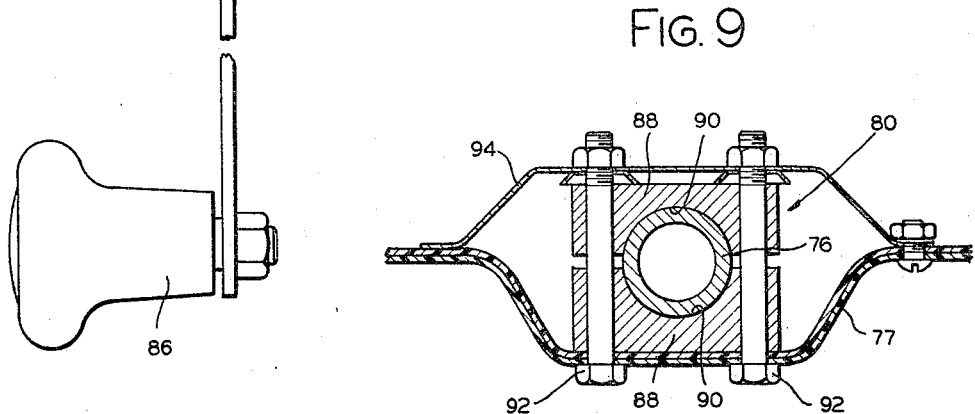
INVENTOR
CYRIL B. ROGERS
BY J. C. Wiensler
ATTORNEY

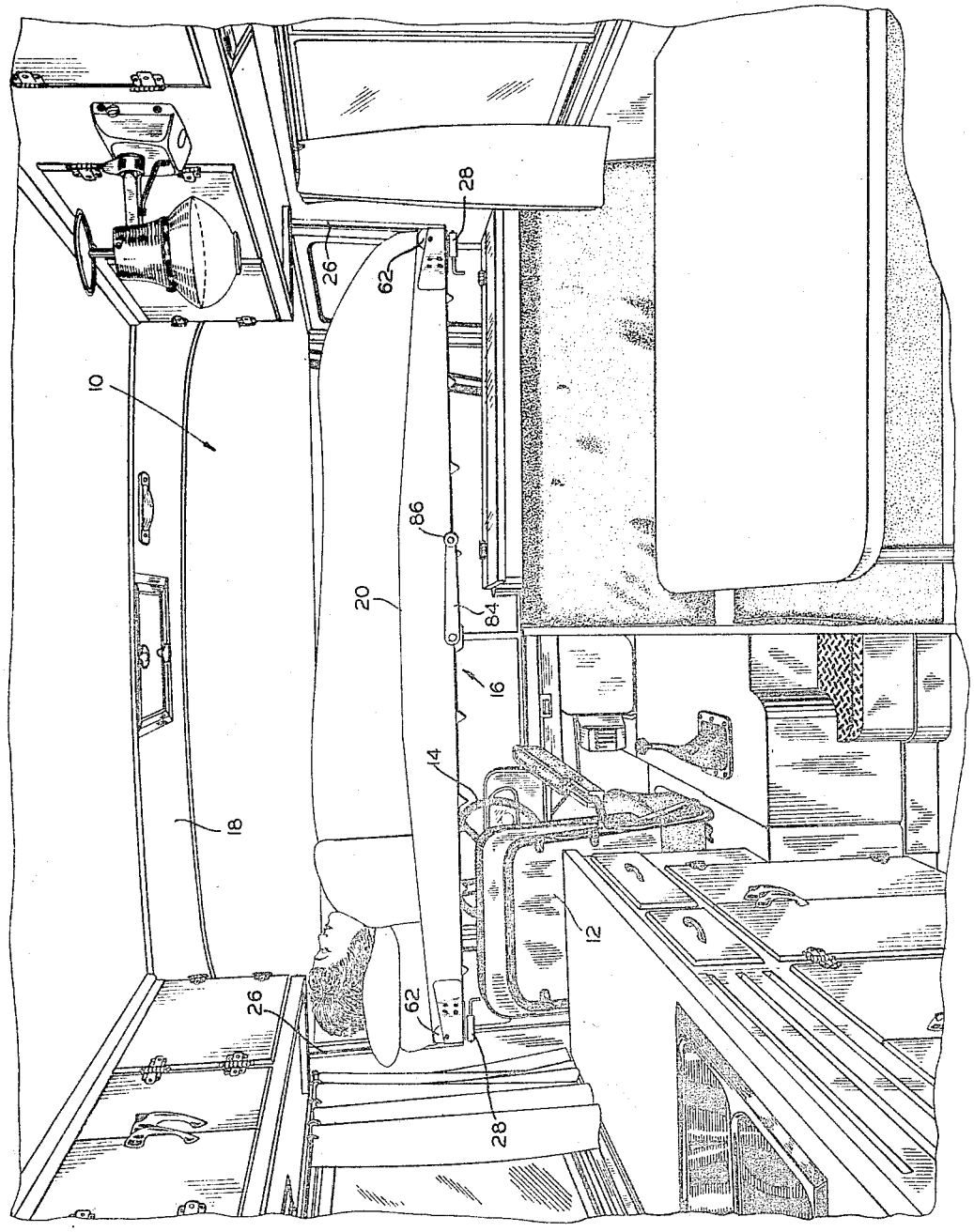

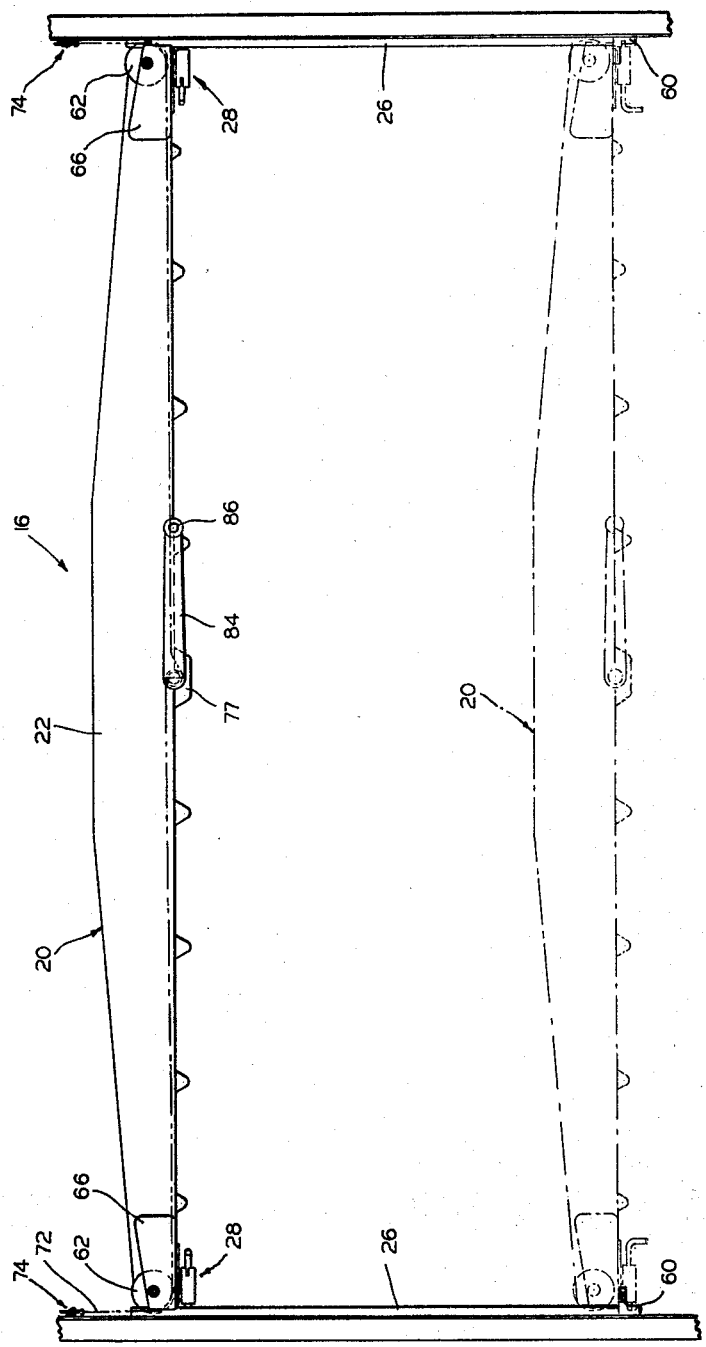

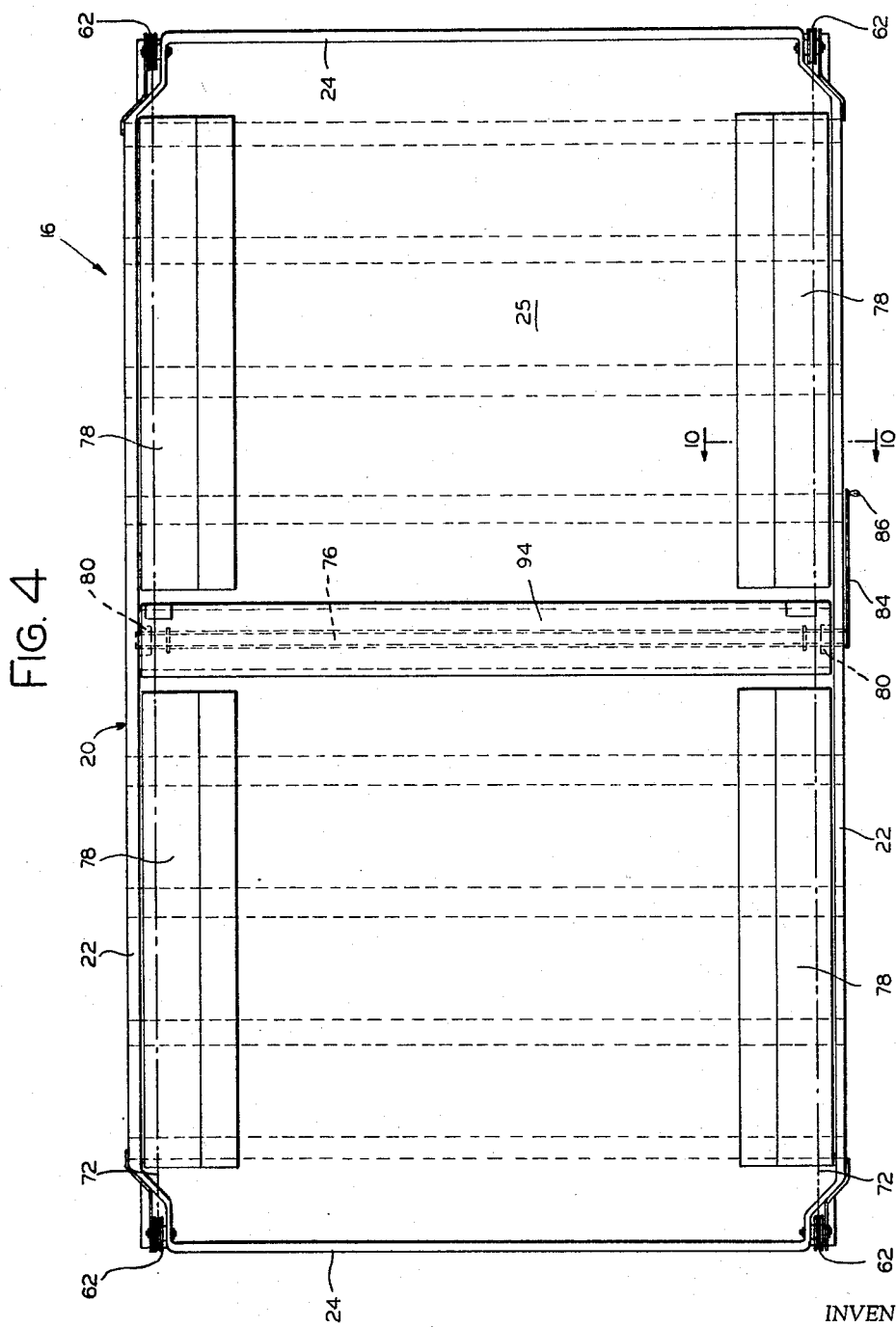

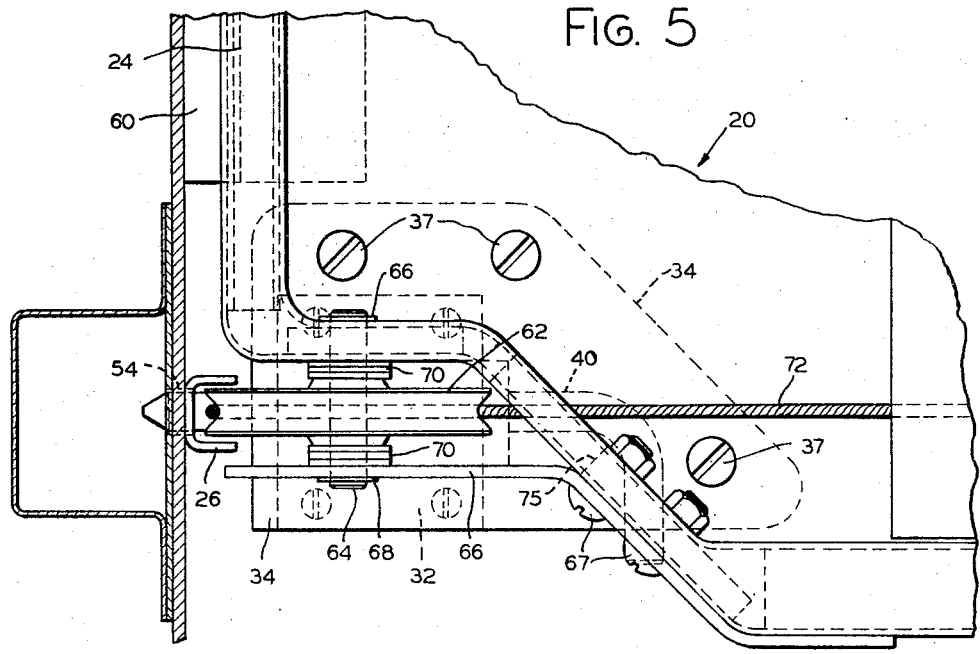
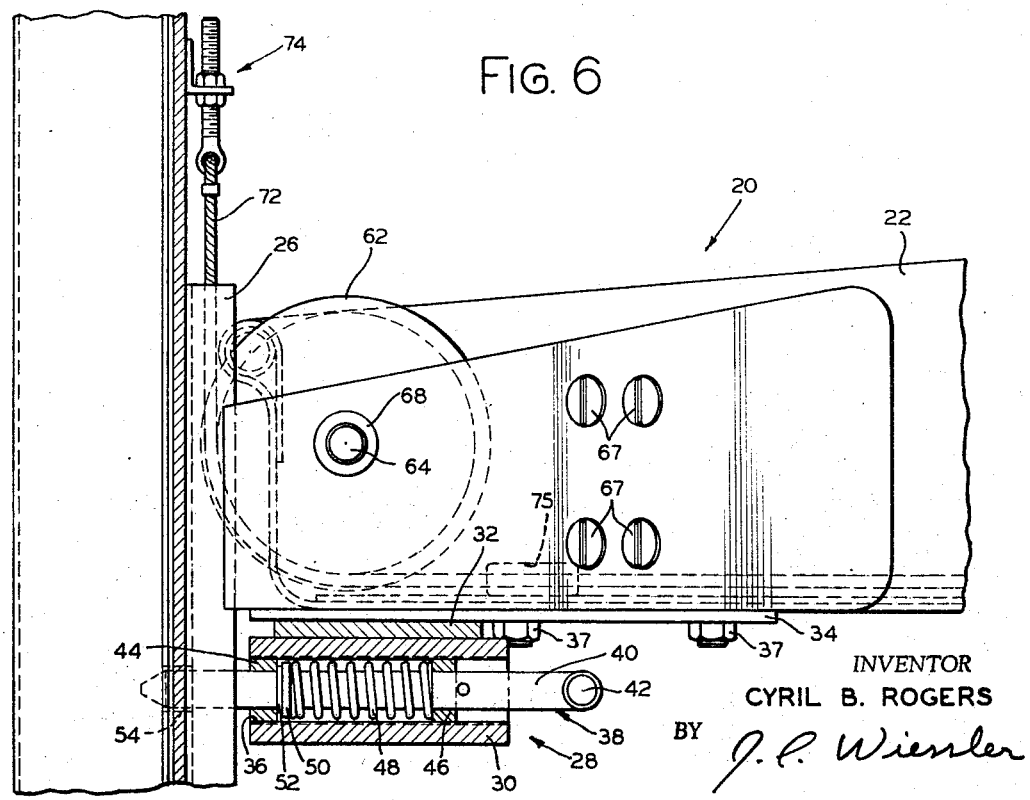

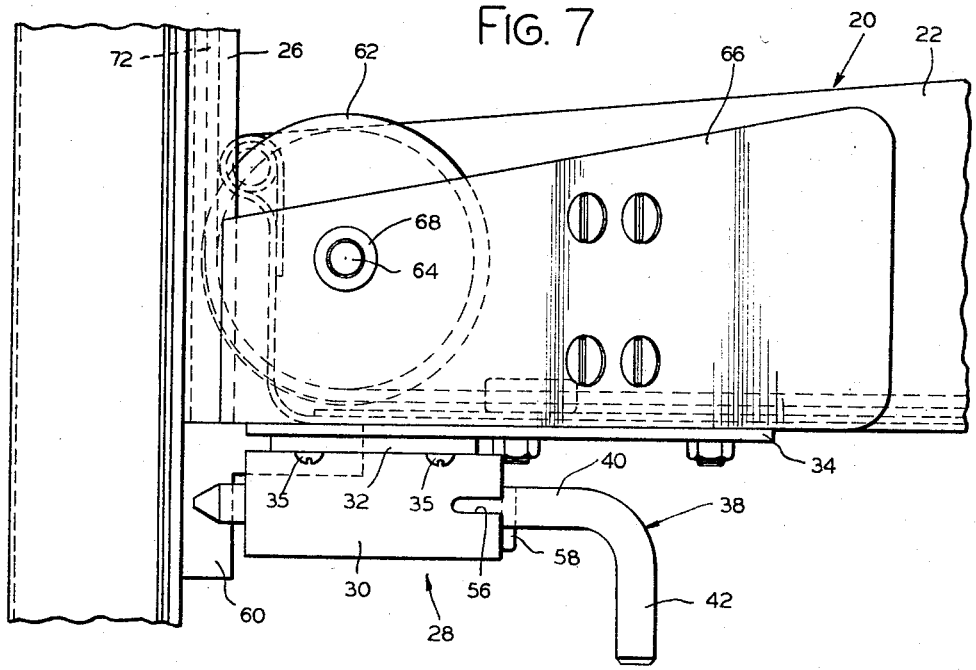
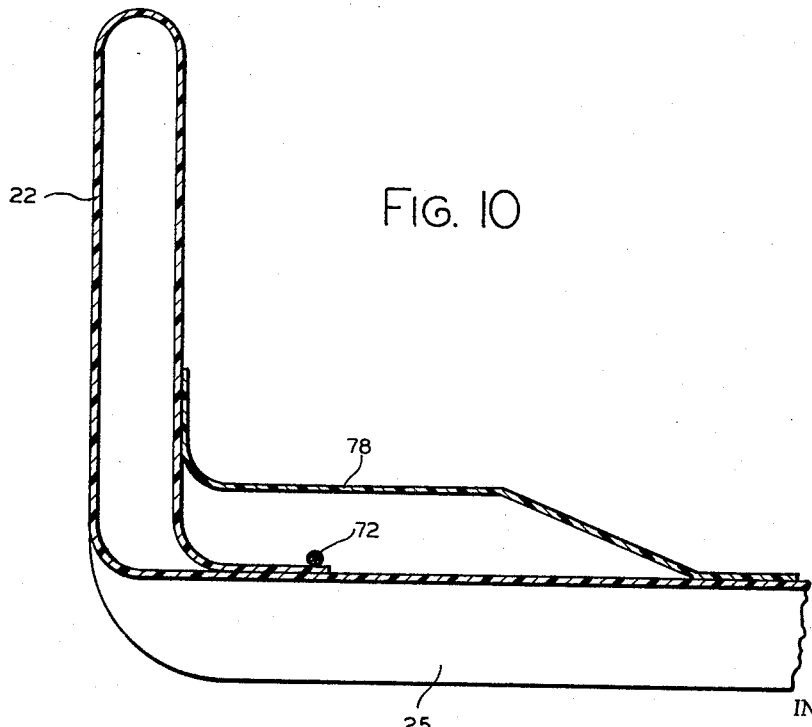

United States Patent Office 3,266,062
Patented August 16, 1966

3,266,062
RETRACTABLE BED
Cyril B. Rogers, Battle Creek, Mich., assignor to Clark Equipment Company, a corporation of Michigan
Filed Feb. 26, 1962, Ser. No. 175,899
4 Claims. (Cl. 5—118)

This invention relates to beds, and more specifically to a retractable bed for use in a vehicle of the type normally used for camping and the like.

In recent years camping has become more and more popular as a pastime. In pursuit of this activity, rather widespread use is made of a shelter unit which is adapted to be carried by a pickup truck. The combination of pickup truck and shelter unit provides a camping vehicle for transporting the camper to the location at which he intends to camp, and also provides him with shelter at the location. This type of arrangement has become popular since it eliminates the problem of setting up and tearing down a tent which otherwise would be necessary to provide shelter at the camp site. There is a disadvantage to such a combination camping unit, however, in that there is no direct means of communication between the shelter unit and the operator's compartment of the pickup truck.

In addition to the above-mentioned camping unit comprising a pickup truck and shelter unit combination there are also available composite of single unit self-propelled vehicles for camping in which the operator's compartment and the living quarters are combined.

The single unit vehicle eliminates the disadvantages of the two-unit vehicle mentioned above, but both the single and two-unit vehicles have in common the problem of rather restricted space in which to provide facilities for living, eating and sleeping. Heretofore the driver or operator's compartment ordinarily has been put to no use other than to provide an area from which the driver operates the vehicle. I propose to utilize the space available in the vehicle to the greatest possible extent by having the driver or operator's compartment serve a duel function. When the camping vehicle is situated at the camp site there is no longer any need to utilize the operator's compartment as such because the unit will not be driven. On the other hand, when the camper vehicle is being driven from one location to another, then the beds normally will not be needed for sleeping. Therefore, it is a principal object of my invention to provide a self-propelled camping vehicle having a space which can be utilized as a driver's compartment and as a sleeping compartment.

A further object of my invention is to provide a vehicle operator's compartment with a bed which can be actuated between a raised storage position and a lowered sleeping position.

Another object of my invention is to provide a bed which can be utilized for storage in the raised position and for sleeping in the lowered position.

In carrying out my invention in one embodiment I provide in a vehicle having a driver's compartment which extends transversely thereof a bed which is actuatable between a raised position adjacent the ceiling of the compartment to a lowered position adjacent the top of the operator's seat and steering wheel.

Other objects, features and advantages of my invention will be readily apparent when the following detailed description is taken in conjunction with the accompanying drawing wherein:

FIGURE 2 is similar to FIG. 1 except the bed is in the lowered position for sleeping;

FIGURE 3 is an elevational view showing the bed and associated track means to advantage, the lowered position of the bed being shown in phantom outline;

FIGURE 4 is a plan view of the bed;

FIGURE 5 is a fragmentary plan view on an enlarged scale of one corner of the bed in the raised position;

FIGURE 6 is similar to FIG. 5, except that it is an elevational view;

FIGURE 7 is similar to FIG. 6, except that the bed is in the lowered position;

FIGURE 8 is a fragmentary sectional view on an enlarged scale of the cable crank;

FIGURE 9 is a cross sectional view showing to advantage the front bearing for the cable crank; and FIGURE 10 is a cross section taken along line 10—10 of FIG. 4.

Figure 1:
FIGURE 1 is a perspective view of the interior of a self-propelled camping vehicle embodying my invention, showing the operator's compartment and the bed in a raised position.

Referring to FIGS. 1 and 2, there is shown the interior of a vehicle, including an operator's compartment 10 which extends transversely across the front of the vehicle. Located in operator's compartment 10 is an operator's seat 12, a steering wheel 14 and various other controls grouped conveniently around the operator's seat 12. Also located in the operator's compartment 10 is a bed 16 which is actuatable vertically between a raised horizontally disposed position adjacent ceiling 18 (FIG. 1) and a lowered horizontally disposed position (FIG. 2).

When bed 16 is not being used for sleeping purposes it may be locked in its raised position (FIG. 1) where it is out of the way and permits normal use of operator's compartment 10 for operating the vehicle. Also, it is to be noted that when bed 16 is in the raised position space 21 above it may serve as a storage space for bedding and the like, for example. When the vehicle is parked and it is desired to use the bed for sleeping, then it is lowered to the position shown in FIG. 2.

At this point it will be appreciated that the space in the front part of the vehicle may be used for either of two principal purposes. That is, it is utilized as an operator's compartment, and also as a sleeping area. Such a dual utilization of space is highly advantageous in this case since when the space is being utilized as an operator's compartment it normally would not be desired to use the space as a sleeping area at the same time, and vice versa.

Referring now to FIGS. 3 through 10, I will describe more specifically bed 16 and the structure for raising and lowering it. Bed 16 includes a rectangular box-like frame 20 having side walls 22 located transversely of the vehicle, end walls 24 and a bottom 25. Frame 20 carries the mattress and other bedding and is arranged to be actuated between a raised position (FIGS. 1 and 3) and a lowered position (FIG. 2) along vertically extending U-shaped channel members or guideways 26 disposed at each corner thereof and secured to the sides of the operator's compartment 10.

When bed 16 is in the raised position frame 20 may be locked in this position by means of four latching devices 28 located at each corner thereof. Each latching device 28 includes a body portion 20 (see FIGS. 6 and 7) which is secured to the underside of a corner of frame 20 by means of a mounting plate 32 thereon which is attached to a corner support plate 34 by any suitable means, such as bolt and nut assemblies 35. The corner support plates 34 are secured to frame 20 in a suitable manner such as by bolt and nut assemblies 37. Body portion 30 of the latch has a longitudinally extending bore 36 which is threaded. An L-shaped locking pin 38 having a pair of leg portions 40 and 42 is disposed so that leg portion 40 extends through bore 36. Also disposed in bore 36 adjacent opposite ends thereof and threadably engaging bore 36 is a pair of annular rings 44 and 46 through which leg portion 40 also passes. Disposed around leg portion 40 and between rings 44 and 46 is a helical spring 48. One end of spring 48 abuts ring 46 and the other end abuts a washer 50 which in turn abuts an annular shoulder 52 on leg portion 40. Spring 48 is under compression so that it tends to bias locking pin 38 to the left, as seen in FIGS. 5 and 6. When frame 20 is raised to the upper position the four locking pins 38, urged by their respective springs engage openings 54 in the adjacent guideways 26. It will be clear at this point that the cooperation of locking pins 38 with openings 54 serves to support frame 20 as well as lock it in position.

Body portion 30 also includes a longitudinally extending slot 56 in the wall thereof which extends inwardly from one end thereof. Slot 56 cooperates with a radially exteinding pin 58 which is attached to leg portion 40 to provide an operative position (FIGS. 5 and 6) when pin 58 is disposed in slot 56 and an inoperative position (FIG. 7) when radially extending pin 58 is out of slot 56 and abuts the end of body 30.

When bed 16 is in the lowered position frame 20 is supported adjacent each corner by means of L-shaped blocks 60 (see FIG. 1) which are secured to the wall of the vehicle and abut the underside of frame 20 as shown.

In order to move bed 16 between the raised and lowered positions a cable and crank mechanism is provided. Adjacent each corner of frame 20 a sheave 62 is mounted for rotation about a horizontally extending axle 64. One end of axle 64 is supported in side wall 22 and the other end is supported by means of a plate 66 which, as shown, is bolted to end wall 22 but nuts and bolts 67. Axle 64 is held in position by means of a pair of friction fasteners 68 which frictionally engage the axle and abut respectively side wall 22 and plate 66. Also, sheave 62 is properly positioned between side wall 22 and plate 66 by means of spacer washers 70. It should be noted that sheaves 62 extend between the arms of the U-shaped channel members 26, and thus prevent horizontal displacement of frame 20 when it is being moved between the raised or lowered position. Passing under sheaves 62 is a pair of cables 72, one adjacent one side of the bed and the other adjacent the other side. Each cable 72 is connected at one end thereof to one side of operator's compartment 10 by means of an eye bolt and bracket assembly 74 which permits adjusting the length of the cable. From assembly 74 each cable 72 is trained around one of the sheaves 62 and then through an opening 75 in the oblique portion of side wall 22 and thence along side wall 22, of the bed passing through a centrally located shaft 76 (see FIG. 4), to the sheave 62 at the corner at the other end of the same side wall 22. The cable is then trained around this sheave and is anchored at the other end of the cable to the other side of operator's compartment 10 by another eye bolt and bracket assembly 74. From a reference to FIG. 10 it will be seen that each cable 72 runs through a passage formed by a side wall 22, framebottom 25 and a pair of elongated plates 78 along side wall 22. Consequently, there will be no interference between the cables and the mattress in frame 20.

From a reference to FIG. 3 it will be apparent that frame 20 can be moved from the raised position to the lowered position (shown in phantom outline) by effectively lengthening cables 72. This is accomplished through rotation of shaft 76. As pointed out before the cables 72 pass transversely through shaft 76 so that rotation of shaft 76 in one direction winds the cables around the outer periphery thereof with the result that their effective length is decreased and rotation in the other direction unwinds the cables with the result that their effective length is increased. Shaft 76 extends transversely of frame 20 (longitudinally of the vehicle) and is located approximately midway between end walls 24 in a transversely extending depressed portion 77 in frame bottom 25. A pair of two-part bearing assemblies 80 (see FIG. 9) are located adjacent opposite ends of shaft 76 and serve to rotatably mount it to frame 20. Two-part bearing assembly 80 includes a pair of identical bearing blocks 88 each having a semicircular bearing surface 90 in facing relation with the bearing surface of the adjacent block. The bearing assembly 80 is held together by a pair of nut and bolt assemblies 92 which pass through depressed portion 77 and a shaft cover plate 94.

One end of shaft 76 extends outwardly through an opening 82 (see FIG. 8) in side wall 22. Secured to the end of shaft 76 which extends through opening 82 is a radially extending crank arm 84 to which is attached a handle 86.

Having described hereinabove a preferred embodiment of my invention I will now explain the operation of my invention. Assume that a vehicle embodying my invention is parked and that it is desired to convert the space normally utilized as an operator's compartment into a sleeping area. The pins 38 of the four latching devices 28 are pulled out of respective openings 54 (FIGS. 5 and 6) to the position shown in FIG. 7 and rotated to retain them in that position. Next, handle 86 is used to rotate shaft 76 so that cables 72 are effectively lengthened with the result that bed 16 is lowered from the position in FIG. 1 to the position shown in FIG. 2. In this position the four corners of frame 20 will be supported upon blocks 60. When the area in driver's compartment 10 is no longer needed as a sleeping area, then bed 16 can be moved out of the way by rotating shaft 76 so that cables 72 are effectively shortened with the result that bed 16 is raised to the position shown in FIGS. 1 and 3. With the bed in this position pins 38 are rotated so that retaining pin 58 is lined up with slot 56, thus permitting each pin 38 to engage opening 54 to again lock bed 16 in its raised position. With bed 16 in the raised position the space between the bed and the ceiling of the vehicle can be used for storage of various items such as extra bedding, for example.

While I have described my invention in a preferred embodiment it will be appreciated that various modifications and changes thereto may be made by those skilled in the art. Consequently, the above detailed description is intended to be illustrative only. The scope of my invention should be determined from the following appended claims taken in conjunction with the prior art.

I claim:

1. In combination, an operator's compartment having vehicular controls therein, a bed disposed in said compartment movable vertically between a raised position adjacent the ceiling of the said operator's compartment and a lowered position, means for locking said bed in the said raised position, means for supporting said bed from the sides of said operator's compartment in the said lowered position, and means for moving said bed between the said raised and lowered positions.

2. In a vehicle, an operator's compartment having a steering control wheel therein and a ceiling, a bed located in said compartment and movable vertically between a raised position adjacent said ceiling and a lowered position adjacent and above said steering control wheel, means for guiding said bed between the said raised and lowered positions, means for locking said bed in the said raised position, means for supporting said bed in the said lowered position, and means for actuating said bed between said raised and lowered positions.

3. In a vehicle, an operator's compartment having a steering control wheel, an operator's seat and a ceiling, a bed disposed in said compartment transversely thereof actuatable vertically between a raised position adjacent and below said ceiling and a lowered position adjacent and above said steering control wheel and said operator's seat, said bed having a sheave at each corner mounted for rotation about a horizontally disposed axis, four vertically disposed channels secured respectively to the side of said operator's compartment adjacent said sheaves, each channel receiving a portion of the adjacent sheave for guiding said bed between the said raised and lowered position, tension means passing under said sheaves and secured to opposite sides of said operator's compartment, and means for changing the length of said tension means so that said bed may be actuated between the said raised and lowered positions.

4. In a vehicle having a longitudinal axis, the combination of an operator's compartment having a steering control wheel, an operator's seat and a ceiling, a bed disposed in said compartment transversely of the vehicular longitudinal axis and actuatable vertically between a raised storage position adjacent and below said ceiling and a lowered use position adjacent and above said steering control wheel and said operator's seat, means for holding said bed in said storage position and means for supporting said bed in said use position.

References Cited by the Examiner

UNITED STATES PATENTS

| | | | |
|---|---|---|---|
| 1,284,936 | 11/1918 | Shine | 296—19 |
| 1,714,613 | 5/1929 | Montgomery | 5—118 |
| 2,658,207 | 11/1953 | Robbins | 5—93 X |
| 3,028,606 | 4/1962 | Boutet | 5—10 |
| 3,032,154 | 5/1962 | McNabb | 5—93 X |

FOREIGN PATENTS 939,553   2/1956   Germany.

FRANK B. SHERRY, *Primary Examiner.*
R. D. KRAUS, *Assistant Examiner.*